United States Patent [19]

Aubin et al.

[11] Patent Number: 4,736,363
[45] Date of Patent: Apr. 5, 1988

[54] PATH ORIENTED ROUTING SYSTEM AND METHOD FOR PACKET SWITCHING NETWORKS

[75] Inventors: Raymond Aubin, Hull; Chi-Ming P. Ng, Gloucester, both of Canada

[73] Assignee: Northern Telecom Limited, Montreal, Canada

[21] Appl. No.: 786,886

[22] Filed: Oct. 11, 1985

[30] Foreign Application Priority Data

Sep. 6, 1985 [CA] Canada ............................. 490197

[51] Int. Cl.$^4$ ............................................. H04Q 11/04
[52] U.S. Cl. ........................................ 370/60; 370/94
[58] Field of Search ...................... 370/60, 94, 110.1

[56] References Cited

U.S. PATENT DOCUMENTS

| | | | |
|---|---|---|---|
| 4,027,048 | 12/1976 | Larson .................................. | 370/60 |
| 4,030,260 | 12/1976 | Toy et al. .............................. | 370/60 |
| 4,314,233 | 2/1982 | Clark .................................... | 370/60 |
| 4,314,367 | 2/1982 | Bakka et al. ......................... | 370/60 |
| 4,577,311 | 3/1986 | Duquesné et al. .................... | 370/60 |
| 4,679,189 | 7/1987 | Olson et al. .......................... | 370/60 |

OTHER PUBLICATIONS

"A Path-Oriented Routing Strategy for Packet Switching Networks with End-to-End Protocols; ACM SIGCOMM Computers, Communication Review, vol. 15, Issue 4, 1985; Aubin et al; pp. 165-171.
"Optimal Routing & Flow Control Methods for Communication Networks", by D. P. Bertsekas, pp. 615-643, in the book Analysis & Optimization of Systems.
"A Responsive Distributed Routing Algorithm for Computer Networks: by J. M. Jaffe and F. H. Moss appearing at pp. 1778-1762 IEEE, vol. COM-30, No. 7 (Jul. 1982).
"The New Routing Algorithm on the SITA Data Transport Network", by J. M. Kaliszewski in Performance of Computer-Communication Systems, pp. 415-431, edite by H. Rudin and W. Bux (Amsterdam:-North Holland, 1984).

*Primary Examiner*—Douglas W. Olms
*Assistant Examiner*—Frank M. Scutch, III
*Attorney, Agent, or Firm*—Robert C. Hogeboom

[57] ABSTRACT

A path oriented routing system and method for packet switching networks with end-to-end internal protocols. It allows switch pairs to communicate over multiple paths without packet disordering. A distributed loop-free shortest path algorithm assigns a number to a path at the time it is created and this number remains valid through path changes. Consequently, existing traffic can be maintained on existing paths, while new traffic is assigned to the current (i.e. new) shortest paths.

4 Claims, 5 Drawing Sheets

FIG. 5a

PATH IDENTIFICATION

| INCOMING PATH ID | OUTGOING PATH ID | OUTGOING TRUNK ID |
|---|---|---|
| 0 | | |
| 1 | | |
| 2 | | |
| 3 | | |
| 4 | | |
| ... | | |
| n | | |

ROUTING TABLE

FIG. 5b

| DESTINATION SWITCH ID | OUTGOING PATH ID | OUTGOING TRUNK ID | DISTANCE (TO DESTINATION) |
|---|---|---|---|
| A | | | |
| B | | | |
| C | | | |
| D | | | |
| E | | | |
| F | | | |
| G | | | |
| H | | | |

SHORTEST PATH TABLE

FIG. 5d

| TRUNK ID | DISTANCE TO NEXT SWITCH |
|---|---|
| 0 | |
| 1 | |
| 2 | |
| ... | |
| n-1 | |
| n | |

METRIC TABLE

FIG. 6

ROUTING TABLE
(FOR SWITCH C OF FIG. 2)

| INCOMING PATH ID | OUTGOING PATH ID | TRUNK ID |
|---|---|---|
| 0 | 0 | 0 |
| 1 | — | — |
| 2 | — | — |

FIG. 7

ROUTING TABLE
(FOR SWITCH C OF FIG. 3)

| INCOMING PATH ID | OUTGOING PATH ID | TRUNK ID |
|---|---|---|
| 0 | 0 | 0 |
| 1 | 0 | 5 |
| 2 | — | — |

FIG. 8

ROUTING TABLE
(FOR SWITCH C OF FIG. 4)

| INCOMING PATH ID | OUTGOING PATH ID | TRUNK ID |
|---|---|---|
| 0 | 0 | 0 |
| 1 | 0 | 5 |
| 2 | 1 | 9 |

FIG. 9

SHORTEST PATH TABLE
(FOR SWITCH A OF FIG. 4)

| DESTINATION SWITCH ID | OUTGOING PATH ID | TRUNK ID | DISTANCE TO DESTINATION |
|---|---|---|---|
| A | — | — | — |
| B | — | — | — |
| C | — | — | — |
| D | — | — | — |
| E | — | — | — |
| F | — | — | — |
| G | — | — | — |
| H | 2 | 4 | 1600 |

PATH ORIENTED ROUTING SYSTEM AND METHOD FOR PACKET SWITCHING NETWORKS

This invention relates generally to packet switching and more particularly to a routing system for packet switching networks.

Routing strategies have a major role to play in optimizing the use of network resources. Switch pairs often communicate over single paths, when optimal routing would typically require multiple paths in order to even out traffic over the network.

Examples of routing systems abound. The following are but a brief overview of the art, to which attention is drawn. "Optimal Routing and Flow Control Methods for Communication Networks" by D. P. Bertsekas, pages 615–643 in the book *Analysis and Optimization of Systems* edited by F. Bensoussan and J. L. Lions (Berlin: Springer-Verlag, 1983); "A Responsive Distributed Routing Algorithm for Computer Networks" by J. M. Jaffe and F. H. Moss appearing at pages 1758–1762 of *IEEE Transactions on Communications*, Vol. COM-30, No. 7 (July 1982); and "The New Routing Algorithm on the SITA Data Transport Network" by J. M. Kaliszewski appearing in *Performance of Computer-Communication Systems*, pages 415–431 edited by H. Rudin and W. Bux (Amsterdam: North Holland, 1984).

SUMMARY OF THE INVENTION

The present invention is directed to a path-oriented routing strategy for packet switching networks with end-to-end internal protocols. It allows the same switch pairs to communicate over multiple paths (for better network throughput), while maintaining knowledge of user connections at the network's endpoints only.

A distributed loop-free shortest path algorithm assigns a number (path identifier or path ID) to a path at the time it is created and this number (path ID) remains valid during shortest path changes. Consequently, existing traffic can be maintained on existing paths, while new traffic is assigned to the new shortest paths. Packet disordering is thus minimized since the packets of a given connection all follow the same path. Stable multiple path routing is thus achieved.

Briefly stated, the invention is implemented as follows. Each switch contains four tables of information: a routing table; a shortest path table; a trunk table; and a metric table. These tables will be described later, in more detail. When a user connection is established (between two end-point switches), each end-point switch obtains the path identifier (path ID) of the then current shortest path (time) to the other endpoint. Every packet sent over the connection is tagged with an appropriate path identifier instead of the more customary identifier of the destination switch. Because these path identifiers remain valid even after the creation of new shortest paths, the same paths can be used by a connection throughout its lifetime (barring any failures).

The routing tables at each switch are indexed by path identifiers (path ID) instead of the more customary identifier of the destination switch. In addition to a truck identifier (trunk I.D.), each entry in the routing table contains the new path ID to be assigned to the packet. Indeed, unlike a destination identifier, a packet's path identifier ID must typically be changed at every relay (or tandem) switch.

Stated in other terms, the present invention is a path-oriented routing method for packet switching networks, wherein the network is comprised of a plurality of interconnected packet switches, the method characterized by: each destination packet switch broadcasting to all its adjacent neighbours the preferred path identifier to use to send messages to it; and each successive packet switch, moving monotonicaly in a direction away from the destination packet switch, broadcasting to all its adjacent neighbours, the preferred path identifier to use to send messages to it destined ultimately for the destination packet switch.

Stated in yet other terms, the present invention is a path-oriented routing system for packet switching networks, wherein the network is comprised of a plurality of interconnected packet switches, the system characterized by: a path identifier being associated with each packet at the source packet switch and carried by the packet as it traverses through the network to the destination switch, the path identifier being updated at each packet switch traversed.

BRIEF DESCRIPTION OF THE DRAWINGS

The invention will now be described in greater detail with reference to the accompanying drawings, wherein like parts in each of the several figures are identified by the same reference character, and wherein:

FIGS. 6, 7, and 8 are routing tables for switch C in the conditions of FIGS. 2, 3 and 4 respectively; and FIG. 9 is a shortest path Table for switch A in the condition of FIG. 4.

FIG. 1 depicts a packet switching network 10 comprised of packet switches A to H, inclusive, and showing all the potential interconnections between the various switches A to H.

Before the theory of operation is described, it may be of value to first consider, in more detail, the philosophy behind what is happening. To do this, refer to FIG. 2.

Figure 1:
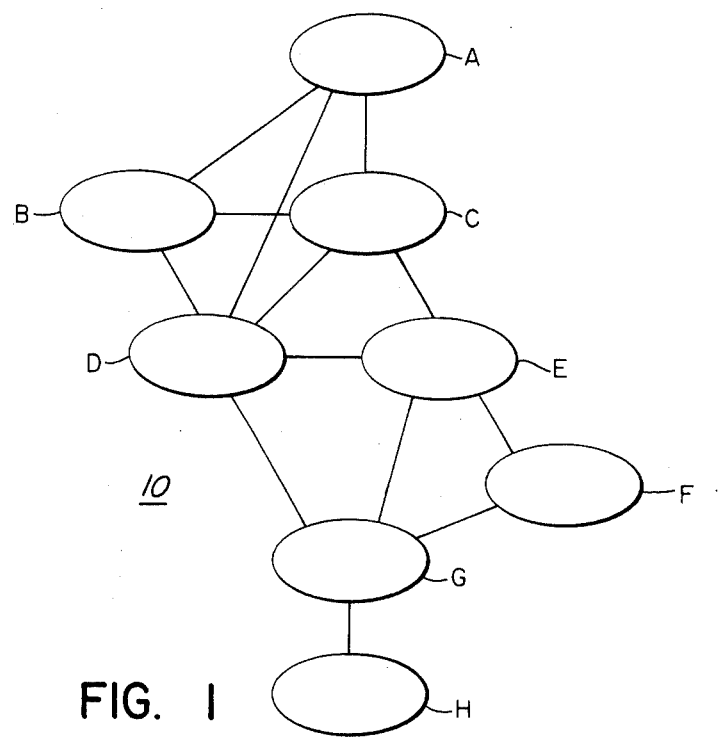
FIG. 1 is a simplified block diagram of a packet switching network, depicting some possible physical trunks between the switches.
Figure 2:
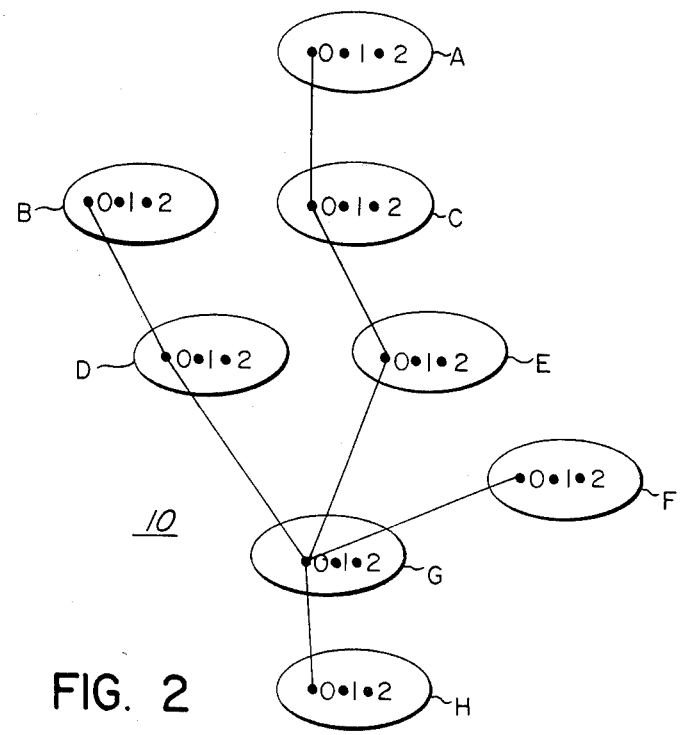
FIG. 2 is similar to FIG. 1 but depicts the logical interconnections between the switches after an initial path assignment to destination H.

FIG. 2 depicts packet switching network 10 from the perspective of the switch which is the destination switch (which in FIG. 2 is of course switch H). In other words, when drawn from the perspective of switch H being the ultimate destination of all the other switches A to G, all paths lead to switch H.

Note also that each switch A to H carries a path ID indicated as 0, 1, or 2. In FIG. 2, each switch A to H has its path identified as path 0. This means that if switch A wishes to send a packet to switch H, it sends it on path 0 (to switch C), switch C sends it on path 0 (to switch E), etc., until it gets to switch H. At the destination switch H, the packet's path ID is mapped to a special end-of-path indicator and further routing information in the packet is used to locate the connection's endpoint.

Figure 3:
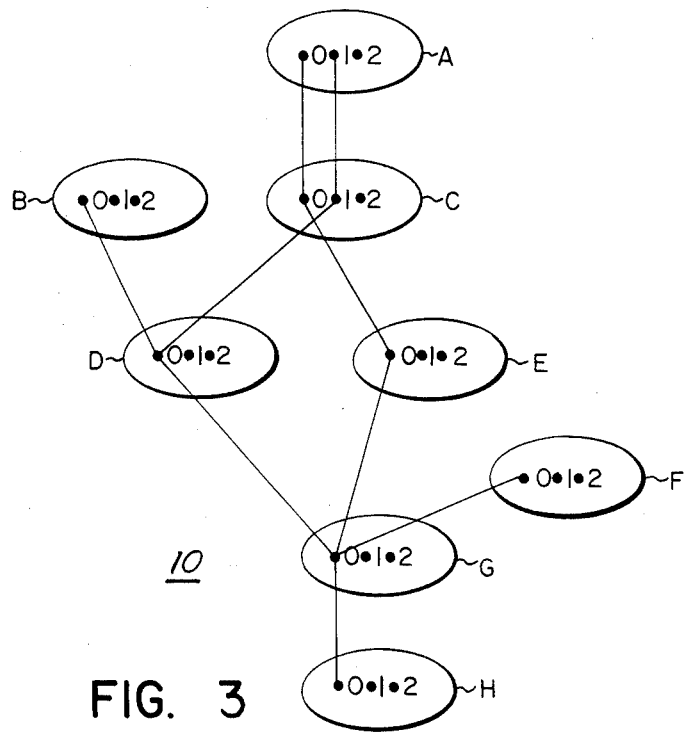
FIG. 3 is similar to FIG. 2 but depicts the logical interconnections between the switches after one path update.

Now compare FIG. 2 to FIG. 3. Traffic between switch C and switch E has increased sufficiently that the shortest path from switch C to switch H is now via switch D. This information is calculated at switch C and is broadcast to all switches that are directly connnected to switch C (i.e. to switches A, B, D, and E in this example). In effect, switch C is saying to all switches that are connected to it, don't make any new connections to me via path 0, but rather, use path 1. Note, however, that existing connections still employ path 0 (as is shown in FIG. 3) and only new connections will use path 1.

New information from switch A (destined for switch H) leaves switch A on path 1 (this may be on the same trunk as is path 0). When the packet gets to switch C it is received on path 1, its path ID is changed to 0, and then the packet is sent to switch D. From switch D the packet follows path 0 through switch G to switch H.

Figure 4:
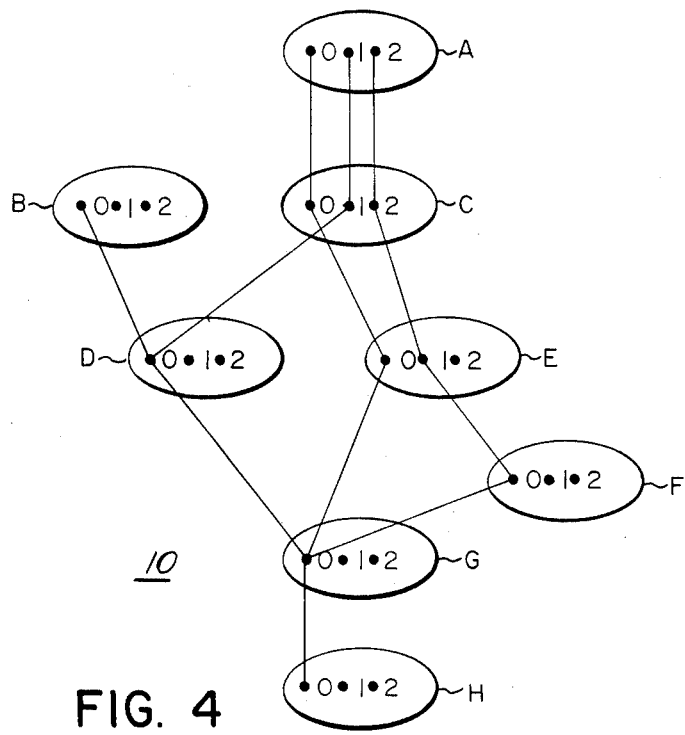
FIG. 4 is similar to FIG. 3 but depicts the logical interconnections between the switches after two path updates.

FIG. 4 depicts switching network 10 after a second path assignment update. Assume that the traffic between switches E and F has decreased enough so that this connection is now chosen as part of the shortest path. Switch E calculates this fact and broadcasts it to all switches directly connected to switch E (i.e. to switches C, D, F, and G). This is reflected in the fact that switch E needs to receive on a new path (i.e. path 1) to distinguish between packets destined for switch G (path 0) and those destined for switch F (path 1). Assume that switches A and C also find that going to switch H via switch E is now shorter, switches A and C operate on path 2 to keep those packets separate from packets on paths 0 and 1.

Note that each time a packet goes through a switch, its path ID gets updated. It may get updated to the same path ID or to a new path ID. Using path ID 2 leaving switch A as an example, it remains path ID 2 entering switch C, in switch C it is changed to path ID 1 and leaves switch C as that. It enters switch E as path ID 1 and in switch E it is changed to path ID 0, which it maintains through switches F, G and H.

Figure 5C:
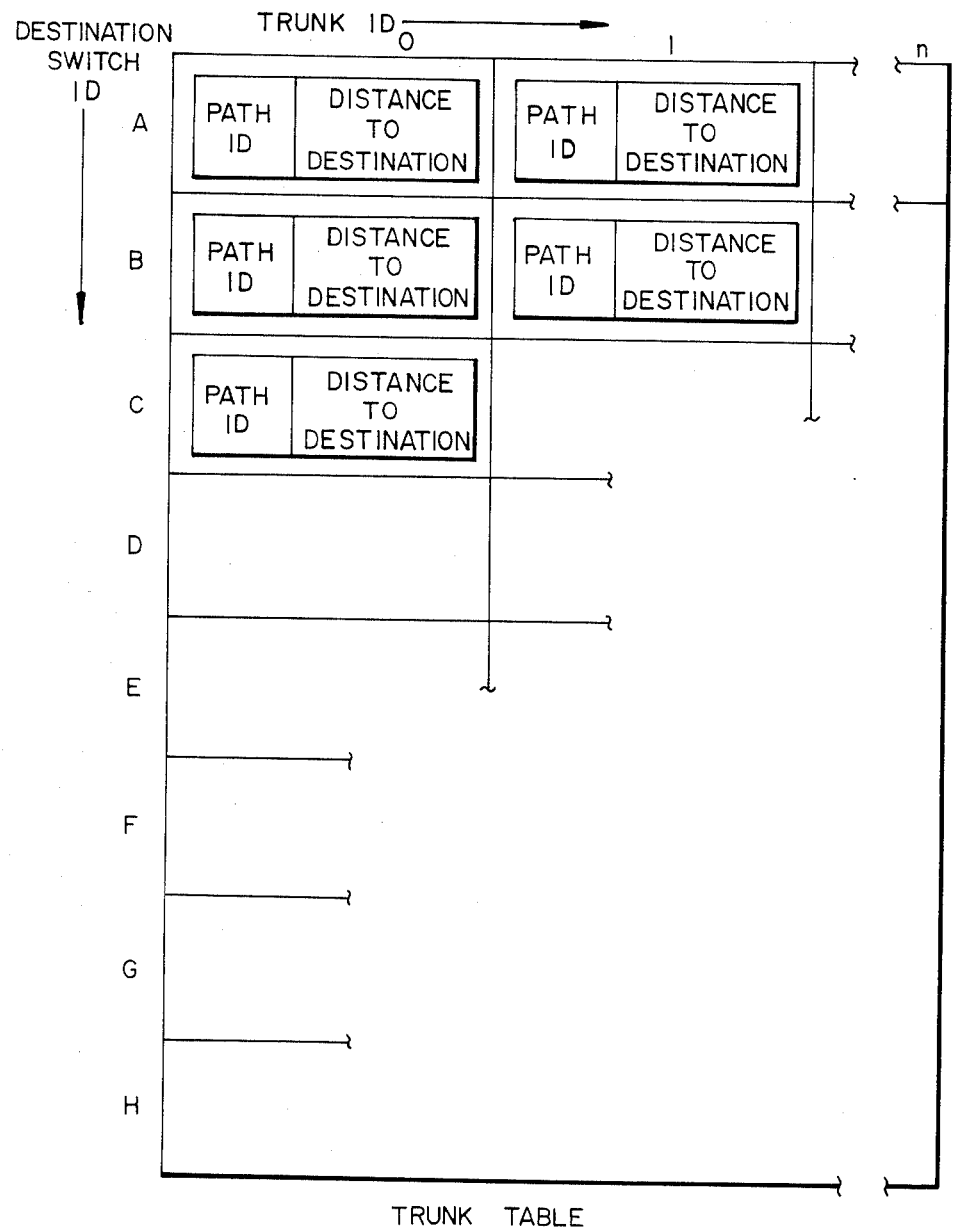
FIG. 5, containing parts a to d, is a stylistic representation of the information tables stored at a switch in the switching network.

FIGS. 5a, 5b, 5c, and 5d (referred to collectively as FIG. 5) depict tables of information contained at each switch A to H. FIG. 5a depicts the routing table for a switch. This table relates an incoming path to an outgoing path when the switch in question is a tandem switch (i.e. not the destination switch). As can be seen from FIG. 5a it is a look-up table (stored in memory at the switch) which is indexed by the incoming path ID.

FIG. 5b depicts the shortest path Table for a switch. As can be seen from the Figure, it is a table indexed by the identifier of the Destination switch (i.e. Destination switch ID). If the switch in question wishes to establish a user connection to switch D (for example) it looks up under switch D for the Outgoing path ID and Truck ID (identifier) to use.

FIG. 5c depicts the trunk Table for a switch. As can be seen from the Figure, this relates destination switch ID, trunk ID, path ID, and distance to destination. Note that the shortest path table (FIG. 5b) is a condensed version of this Trunk Table. That is, the Trunk Table contains information on all the possible shortest paths to a destination, while the shortest Path Table (FIG. 5b) contains only the current shortest paths.

FIG. 5d is a Metric Table depicting the distance of each trunk to the next switch. Note that the use of the term "distance" in the present context does not mean physical distance but rather is a term well known in this art that is a function of the time delay incurred by a packet moving from one switch to another. A normalized value of distance is typically used (ranging, for example, from 0 to 2,048 for a single trunk). This concept is also sometimes referred to as "cost" or "delay".

The use of the Tables in FIG. 5 and their interrelationship will now be described.

Let's assume that the network of FIG. 2 is being established. The destination switch (i.e. switch H) broadcasts to its neighbours (only switch G in this example) a message that says: "if you want to send a data message to me, sent it on a path having path ID=0". This is then stored in the Trunk Table at switch G and it is also stored in the Shortest Path Table and the Routing Table at switch G if indeed this path is shortest for switch G.

Switch G then broadcasts a message to its neighbours (i.e. switches D, E, and F) that says, in effect: "If you want to send a message to switch H via me, send it on a path having Path ID=0". Switch G can then use its Routing Table to transfer any message it receives coming in on a path with path ID=0 to being sent on a path with path ID=0. It can do this without having any further information about the message. Note that the path ID may or may not change as it passes through a switch. Specific examples of Routing Tables for Switch C can be found in FIGS. 6, 7, and 8. A specific example of a Shortest Path Table for Switch C (of FIG. 4) is depicted in FIG. 9.

The remainder of the switches in FIG. 2 are initialized in an analagous manner. Note that the information contained in the Routing Table is used when the switch is acting as a Tandem switch for packets; under these circumstances, the shortest Path Table (at that Tandem switch) is not needed. The Shortest Path Table is used only when that switch is originating a user connection for the destination switch (or when receiving updated routing information).

Suppose the situation changes, and switch E becomes too busy to handle more traffic from switch C bound for switch H (see FIG. 3). In effect, switch E has sent a message to switch C saying: "My distance to switch H on path ID=0 has increased". Note however, that switch E continues to handle existing traffic on path ID=0; it is only new traffic that switch E will not handle.

Switch C now chooses a new shortest path by examining its Trunk Table and chooses a path via switch D and alters its Shortest Path Table and its Routing Table accordingly.

However, switch C has to distinguish the traffic it receives from switch A into previously existing traffic (still to be sent to switch E on path ID=0) and new traffic to be sent via switch D. It does this by sending a message to switch A to send new messages, destined for switch H, with path ID=1. Switch C then receives a message with path ID=1, converts the path ID to 0 and sends it to switch D.

After a second update the situation is as shown in FIG. 4, and the Shortest Path Table for Switch A representing such a situation is shown in FIG. 9.

SHORTEST PATH ALGORITHM

Case 1. Switch S receives UPDATE (DESTINATION-ID, DISTANCE, PATH-ID) over trunk T:
   a. Set TRUNK TABLE (T, DESTINATION-ID) to (PATH-ID, DISTANCE+METRIC(T)).
   b. Reevaluate to shortest distance and the best outgoing trunk for DESTINATION-ID in the shortest path table, in the light of the UPDATE received.

c. If the shortest distance to DESTINATION-ID has changed:
   (i) update the shortest path table by assigning the TRUNK ID, the DISTANCE, and the PATH ID of the best outgoing trunk to the entry corresponding to DESTINATION-ID
   (ii) select a new PATH ID (using the New Path ID Selection Algorithm) and update the routing table by assigning the TRUNK ID and the PATH ID of the best outgoing trunk above to the entry corresponding to this new PATH ID
   (iii) send UPDATE (DESTINATION, new shortest distance, new PATH ID) over all trunks outgoing from switch S.

Case 2. The value of METRIC(T) changes at switch S: For all DESTINATION-ID, do:
   (a) Increment or decrement the DISTANCE field in TRUNK TABLE (T, DESTINATION-ID) according to change in METRIC(T).
   (b) Do 1.b and 1.c above.

NEW PATH ID SELECTION ALGORITHM

Assume switch S selects T and P to be the best outgoing TRUNK and PATH ID for a destination D, then a new PATH ID is selected by S as follows:

Case 1. If the distance from S to D is infinite or if P is the undefined PATH ID, then S selects the undefined PATH ID. (No traffic can be carried on a path labelled with the undefined PATH ID).

Case 2. Otherwise, if there is already a PATH ID Q mapping to P in the routing table, then S reuses Q.

Case 3. Otherwise, if there is a PATH ID Q that is unassigned in the routing table, the S chooses Q.

Case 4. Otherwise, S uses the undefined PATH ID.

What is claimed is:

1. A path-oriented routing method for packet switching networks, wherein said network is comprised of a plurality of interconnected packet switches wherein at any given period of time each said packet switch can be functioning as a destination switch, an originating switch, a tandem switch, or any combination of the preceding, said method characterized by:

each given packet switch broadcasting to all its adjacent neighbouring switches a preferred single path identifier to use to send messages to it; and each successive packet switch, moving monotonically in a direction away from said given packet switch, broadcasting to all its adjacent neighbouring switches, the preferred single path identifier to use to send messages to it destined ultimately for said given packet switch.

2. A path-oriented routing system for packet switching networks, wherein said network is comprised of a plurality of interconnected packet switches, said system characterized by:

a single path identifier being associated with each packet at the source packet switch and carried by the packet as it traverses through said network to a given destination switch, said single path identifier being updated at each packet switch traversed.

3. The path-oriented routing system of claim 2 wherein each said packet switch maintains information concerning the shortest path from itself to a given destination switch, and in addition maintains information for relating the incoming single path identifier to both a single outgoing path identifier to be appended to a packet and a trunk identifer to be used locally by said packet switch.

4. A method of routing packets of information on a packet switching network comprised of a plurality of interconnected packet switches, said method characterized by:

assigning to each said packet as it is being assembled, a single path identifier indicative of the path said packet is to follow on the way to its destination;

updating periodically said single path identifier that is to be assigned to the packet at the originating switch, wherein packets corresponding to new connections may be assigned new path identifiers, while packets corresponding to existing connections continue to employ the same path identifier as did earlier packets in the same connection and routing each said packet, at each said packet switch, to the path indicated by said single path identifier.

* * * * *